E. W. REIBER.
SPOTLIGHT.
APPLICATION FILED NOV. 1, 1920. RENEWED JAN. 20, 1922.
1,427,329.
Patented Aug. 29, 1922
2 SHEETS—SHEET 1.
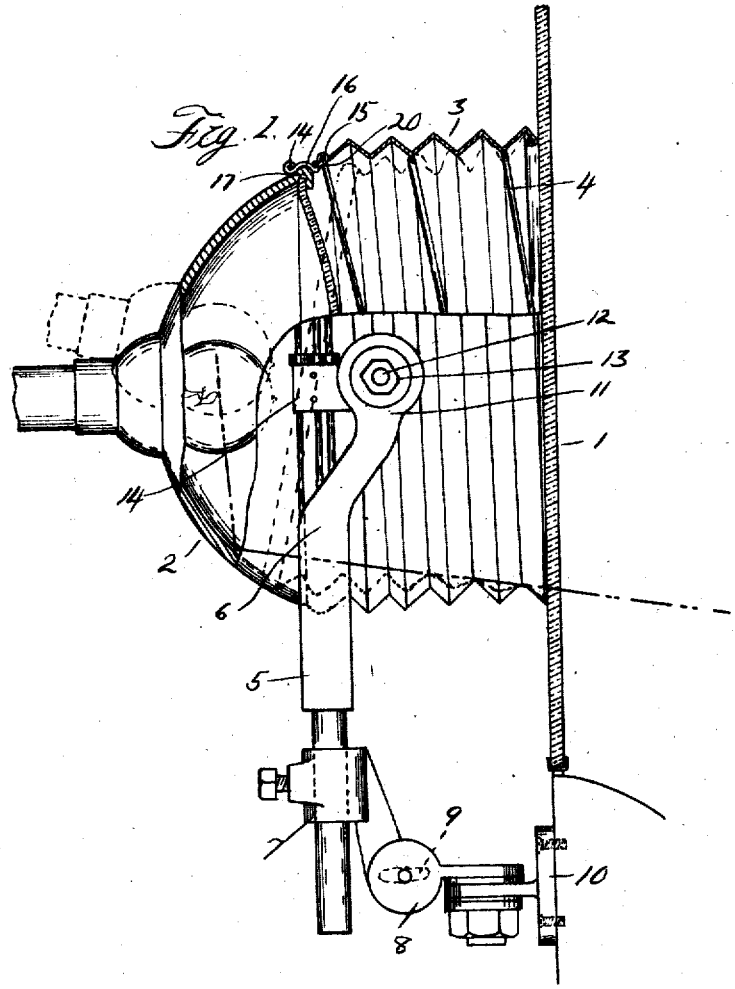
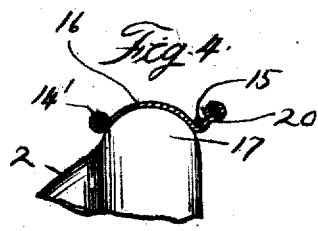
Inventor
Edward W. Reiber
By [signature]
Attorneys E. W. REIBER.
SPOTLIGHT.
APPLICATION FILED NOV. 1, 1920. RENEWED JAN. 20, 1922.
1,427,329.
Patented Aug. 29, 1922.
2 SHEETS—SHEET 2.
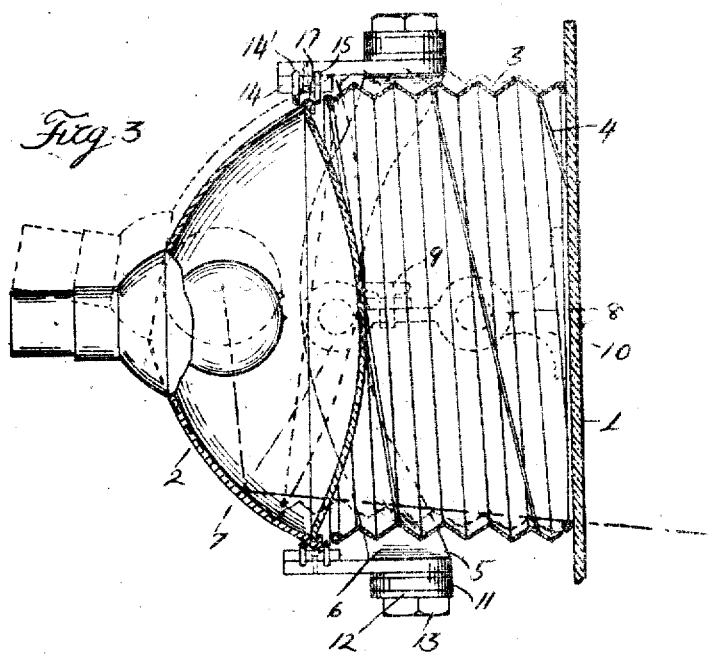
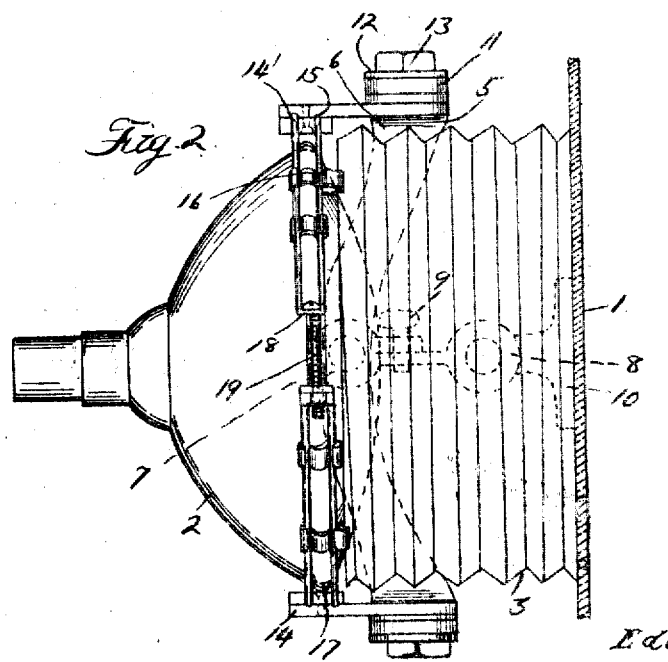
Inventor
Edward W. Reiber ically adjustable in a vertical plane and connected to the horizontally rotatable member 8 by means of the thumbscrew 9, which latter holds the member 7 in its adjusted position. The member 8 is pivotally mounted upon # UNITED STATES PATENT OFFICE.

EDWARD W. REIBER, OF ADRIAN, MICHIGAN, ASSIGNOR TO THE REIBER-KOLZ COMPANY, OF ADRIAN, MICHIGAN, A CORPORATION OF MICHIGAN.

SPOTLIGHT.

1,427,329. Specification of Letters Patent. Patented Aug. 29, 1922.

Application filed November 1, 1920, Serial No. 420,900. Renewed January 20, 1922. Serial No. 530,729.

*To all whom it may concern:*

Be it known that I, EDWARD W. REIBER, a citizen of the United States of America, residing at Adrian, in the county of Lenawee and State of Michigan, have invented certain new and useful Improvements in Spotlights, of which the following is a specification, reference being had therein to the accompanying drawings.

The invention relates to spot lights and is adapted particularly for use in closed motor vehicles such as sedans. One of the objects of the invention is to provide a guard for the light rays which is located between the light and the windshield for the purpose of preventing reflection of the light rays into the driver's eyes and to provide a support for this light which has a pivotal connection with and forward of the light so that the guard will not appreciably interfere with the light rays upon adjusting the light. In this connection, reference is made to my copending application, Serial No. 364,921, filed March 11, 1920, which shows and claims the windshield, the projector facing the same, and the guard for preventing reflection past the projector of the light rays striking the windshield. Other objects of the invention reside in the novel features of construction, and combinations and arrangements of parts as more fully hereinafter set forth.

In the drawings:

Figure 1 is a sectional side elevation of a construction embodying my invention;

Figure 2 is a top plan view thereof;

Figure 3 is a sectional top plan view thereof;

Figure 4 is an enlarged detail view.

1 is the windshield of a motor vehicle, 2 the spot light in rear thereof, and 3 the guard for the light rays passing from the light to the windshield. This guard is preferably formed of a pliable corrugated fabric having a general cylindrical shape, and its outer end is yieldingly held in engagement with the windshield by means of the coil spring 4.

5 is the support for the light which comprises the yoke 6 adjustably slidably engaging in the member 7 which is adjustably rotatable in a vertical plane and connected to the horizontally rotatable member 8 by means of the thumbscrew 9, which latter holds the member 7 in its adjusted position. The member 8 is pivotally mounted upon the bracket 10, which in the present instance is adapted to be secured to the cowl of the motor vehicle. The bifurcations 11 of the yoke are pivotally connected to the light as at 12 so that the light is adjustably rotatable in both the vertical and horizontal planes, and is therefore universally adjustable to throw the light rays at the desired point in advance of the motor vehicle. Nuts 13 are preferably provided for varying the frictional resistance to turning of the adjustably rotatable parts, so that this resistance is sufficient to maintain the parts in their adjusted positions.

For the purpose of supporting the light 2 so that the guard 3 will not appreciably interfere with the light rays thrown from the light when adjusted through limited angles, the pivotal connection 12 and also the pivotal connection between the member 8 and bracket 10 is located forward of the light and between the light and the windshield. This is effected by means of the plates 14 at the opposite sides of the light and extending forwardly thereof, which plates are pivotally connected to the bifurcations 11 of the yokes 6 and 12.

Referring to Figure 1, the full lines show the light and casing with the axis of the light in a substantially horizontal plane in which position the guard does not intercept any of the light rays striking the reflector in substantially vertical alignment with the axis of the light. With the light tilted downwardly about the pivots 12, as shown by the dotted lines, a very small proportion of the light rays striking the reflector, namely those below the dot and dash line, will be intercepted by the guard. Referring to Figure 3, the full lines show the light and casing with the axis of the light in a plane substantially perpendicular to the windshield, while the dotted lines show the light and casing with the light laterally adjusted about the pivot between the member 8 and bracket 10. In this latter position only those light rays striking the outer edge of the reflector beyond the dot and dash line are intercepted by the guard.

Thus it is seen that by having the pivots for the light forward of the same that the guard intercepts but a very small proportion of the light rays when the light is in any of its angularly adjusted positions.

. For securing the guard 3 to the light 2, the following construction is provided: 14' and 15 are parallel wires which are connected by the U-shaped members 16 and to which are clamped the plates 14. These wires are adapted to engage the opposite sides of the beaded forward edge 17 of the light and have at their end the outwardly-extending inverted U-shaped portions 18 through which passes the screw bolt 19 for tightening the wire's edge and seating the U-shaped members 16 upon the beaded forward edge. These wires may be formed integral. Certain of these U-shaped members are provided with forwardly extending portions 20 which are clamped around the rear annulus of the coil spring 4 to secure the annulus to the spot light.

What I claim as my invention is:

1. The combination with a transparent member, of a projector facing said member and movable relative thereto, a guard for enclosing the light rays from said projector to said transparent member, and a support for said projector having a universal pivotal connection arranged forward of said projector.

2. The combination with a member formed of transparent material, of a projector facing said transparent member and movable relative thereto, a guard for surrounding the light rays, mounted upon said projector and extending to said transparent member, and a support for said projector having a pivotal connection with and forward of said projector.

3. The combination with a windshield, of a projector facing the same, a guard for the light rays extending between said projector and windshield, members secured to opposite sides of said projector and extending forward thereof, and a support for said projector pivotally connected to said members forward of said projector.

4. The combination with a windshield, of a projector facing the same, a guard for the light rays extending from said projector to said windshield, members secured to opposite sides of said projector and extending forward thereof, a yoke pivotally connected to said members and between said projector and windshield, and means carrying said yoke and having a pivotal connection permitting of swinging said projector at right angles to the plane of swinging permitted by said first-mentioned pivotal connection.

5. The combination with a projector, of a guard for the light rays extending forward of said projector, members at opposite sides of said guard, common means for securing said guard and members to said projector, and a support for said projector pivotally connected to said members.

6. The combination with a projector having a beaded forward edge, of a guard for the light rays extending forward of said projector, substantially parallel wires secured to said projector upon opposite sides of said bead, U-shaped members connecting said wires and seated upon said beaded edge, and means for securing said guard to the wire at the front side of said beaded edge.

7. The combination with a projector having a beaded forward edge, of a guard for the light rays extending forward of said projector, substantially parallel wires at opposite sides of said bead and having adjacent ends, U-shaped members connecting said wires and seated upon said bead, extensions upon said U-shaped members and secured to said guard, and means for drawing the ends of the respective wires toward each other.

In testimony whereof I affix my signature.

EDWARD W. REIBER.